3,076,827
3-HALO-19-NOR-Δ⁵⁽¹⁰⁾-ANDROSTEN-17β-OL
DERIVATIVES
Albert Bowers and John Edwards, Mexico City, Mexico, and John A. Zderic, Palo Alto, Calif., assignors, by mesne assignments, to Syntex Corporation, a corporation of Panama
No Drawing. Filed Mar. 5, 1962, Ser. No. 177,259
20 Claims. (Cl. 260—397.5)

The present invention relates to novel cyclopentanophenanthrene derivatives and to a process for the production thereof.

More particularly the present invention relates to novel 3-halo-19-nor-Δ⁵⁽¹⁰⁾-androsten-17β-ol derivatives.

The novel compounds of the present invention are represented by the following formula:

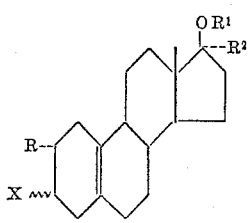

In the above formula X represents fluorine, chlorine or bromine; R represents hydrogen or methyl; $R^1$ represents hydrogen or a hydrocarbon carboxylic acyl group of less than 12 carbons atoms and $R^2$ represents hydrogen, lower alkyl, lower alkenyl or lower alkynyl. The wavy line at C-3 denotes the substituent thereat is in α or β steric configuration.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formula are progestational agents with high oral activity, exhibit anti-estrogenic and anti-gonadotrophic activity and are useful in fertility control. In addition they lower the cholesterol level in blood, serum and adrenal.

The compounds object of the present invention are prepared by the process illustrated as follows:

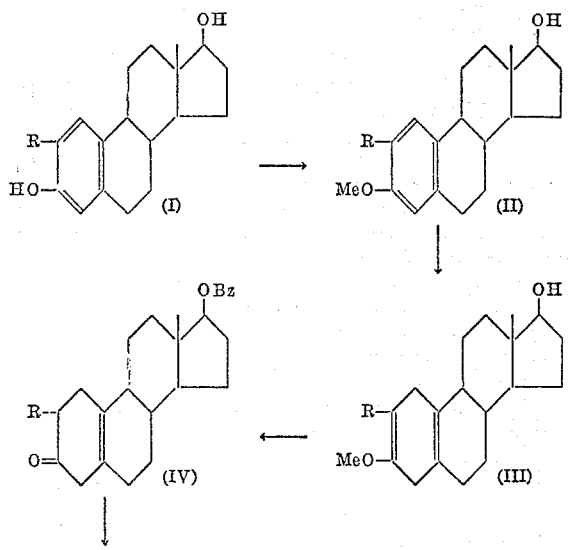

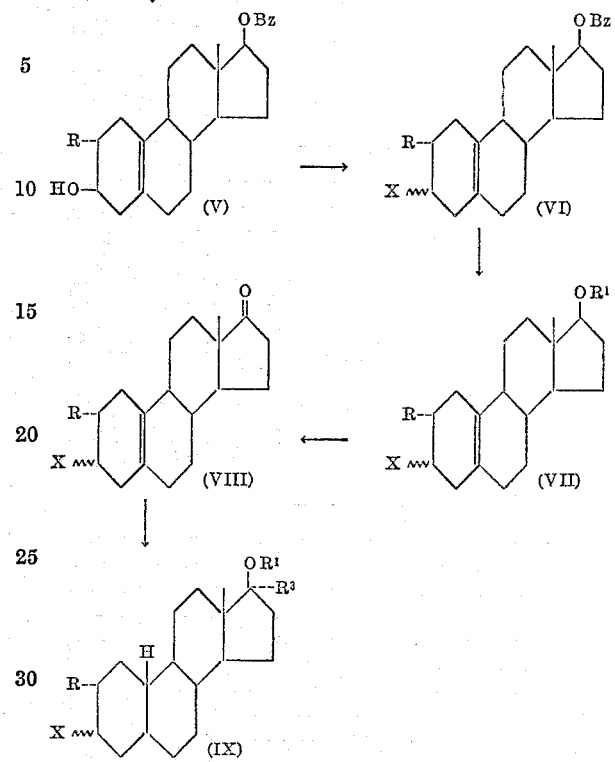

In the above formulas X, R, $R^1$ and $R^2$ have the same meaning as previously set forth; $R^3$ represents lower alkyl, lower alkenyl or lower alkynyl.

In carrying out the process just outlined, the starting compound (I), which may be estradiol or the 2-methyl derivative thereof, is treated with methyl sulfate in a strongly basic medium, such as acetone-water solution of potassium hydroxide, to give respectively the 3-methoxy-Δ¹,³,⁵⁽¹⁰⁾-estratrien-17β-ol or the 2-methyl derivative thereof (II). Reduction of the latter compounds under Birch conditions is productive of the respective 3-methoxy - Δ²,⁵⁽¹⁰⁾ - estradien - 17β - ol (III). Conventional benzoylation of the latter, followed by treatment in a mild acid medium, preferably oxalic acid solution in a suitable solvent, yields 19 - nor - Δ⁵⁽¹⁰⁾-androsten-17β-ol-3-one-benzoate or the 2α-methyl derivative thereof, which upon reduction, preferably with sodium borohydride in dioxane, furnish the respective 19-nor-Δ⁵⁽¹⁰⁾-androstene-3β,17β-diol-17-benzoate (V). These compounds are treated with a halogenating agent, such as hydrogen-fluoride, phosphorus pentachloride or phosphorus pentabromide, thus affording the 3α and 3β-fluoro, chloro or bromo 19-nor-Δ⁵⁽¹⁰⁾-androsten-17β-ol-benzoate or the 2α-methyl derivatives thereof (VI). Conventional saponification of a compound selected from the group just mentioned is productive of the respective 17β-free alcohol (VII: $R^1$=H) which upon oxidation, preferably with 8 N chromic acid furnishes the corresponding 17-ketone (VIII). The latter compound is treated with a lower hydrocarbon magnesium halide, such as methyl magnesium bromide, vinyl magnesium bromide or ethynyl magnesium bromide thus affording the corresponding 17α-lower hydrocarbon 17β-ol derivative (IX: $R^1$=H), as for example the 17α-methyl, vinyl or ethynyl-17β-alcohols.

The above set forth compounds with a secondary hydroxyl in the molecule (VII: $R^1$=H) are conventionally esterified in pyridine with an acylating agent, for instance, the anhydride of a hydrocarbon carboxylic acid of the previously defined type. The compounds of the present invention having a tertiary hydroxyl in the molecule (IX: $R^1$=H) are conventionally acylated in the presence of p-toluenesulfonic acid with an acylating agent, thus giving the corresponding 17β-acylates (IX: $R^1$= acyl).

The following specific examples serve to illustrate but are not intended to limit the scope of the present invention:

Example I

To a suspension of 25 g. of estradiol in 25 cc. of acetone there was added a solution of 70 g. of potassium hydroxide in 37.5 cc. of water and the stirred mixture was treated dropwise with 40 cc. of methyl sulfate. The reaction mixture was then stirred for 45 minutes further, poured into dilute hydrochloric acid solution and the formed precipitate collected by filtration. Crystallization from chloroform-methanol gave 3-methoxy-$\Delta^{1,3,5(10)}$-estratrien-17β-ol.

Following the same procedure 2-methyl-estradiol (Iriarte et al., Tetrahedron, vol. 3, pp. 28–36, 1958), was converted into 2-methyl-3-methoxy-$\Delta^{1,3,5(10)}$-estratrien-17β-ol.

Example II

A cold solution of 6 g. of 3-methoxy-$\Delta^{1,3,5(10)}$-estratrien-17β-ol in 750 cc. of anhydrous ether was added to 900 cc. of liquid ammonia and then 7.8 g. of lithium wire over 10 minutes, with constant stirring. The mixture was stirred for 20 minutes more, 160 cc. of absolute ethanol were then cautiously added and the ammonia was allowed to evaporate. Water was added to the residue, the ether distilled off and the resulting 3-methoxy-$\Delta^{2,5(10)}$-estradien-17β-ol collected, washed with water and dried.

By the above procedure 2-methyl-3-methoxy-$\Delta^{1,3,5(10)}$-estratrien-17β-ol was transformed into 2-methyl-3-methoxy-$\Delta^{2,5(10)}$-estradien-17β-ol.

Example III

A mixture of 1 g. of 3-methoxy-$\Delta^{2,51(0)}$-estradien-17β-ol, 4 cc. of pyridine and 2 cc. of benzoyl chloride was kept at room temperature overnight, poured into ice water, the formed precipitate was filtered, washed with water and dried. Crystallization from acetone-hexane gave the 17-benzoate of 3-methoxy-$\Delta^{2,5(10)}$-estradien-17β-ol.

2-methyl-3-methoxy-$\Delta^{2,5(10)}$-estradien-17β-ol was treated by the above procedure thus yielding the 17-benzoate of 2-methyl-3-methoxy-$\Delta^{2,5(10)}$-estradien-17β-ol.

Example IV

To a solution of 6 g. of the 17-benzoate of 3-methoxy-$\Delta^{2,5(10)}$-estradien-17β-ol in 500 cc. of methanol were added 8 g. of oxalic acid dissolved in 10 cc. of water. The resulting mixture was kept at room temperature for 40 minutes. Then water was added and the formed precipitate filtered off, washed with water and dried. Recrystallization from acetone-hexane yielded the 17-benzoate of 19-nor-$\Delta^{5(10)}$-androsten-17β-ol-3-one.

Similarly the 17-benzoate of 2-methyl-3-methoxy-$\Delta^{2,5(10)}$-estradien-17β-ol was converted into the 17-benzoate of 2α-methyl-19-nor-$\Delta^{5(10)}$-androsten-17β-ol-3-one.

Example V

A solution of 2 g. of sodium borohydride in 30 cc. of methanol was added with stirring to a solution of 2 g. of 19-nor-$\Delta^{5(10)}$-androsten-17β-ol-3-one-benzoate in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave 19-nor-$\Delta^{5(10)}$-androstene-3β,17β-diol-17-benzoate.

When applying the above procedure to 2α-methyl-19-nor-$\Delta^{5(10)}$-androsten-17β-ol-3-one-benzoate there was obtained 2α-methyl-19-nor-$\Delta^{5(10)}$-androstene-3β,17β-diol-17-benzoate.

Example VI

In a polyethylene flask, adapted with magnetic stirrer, there was dissolved 2.8 g. of 19-nor-$\Delta^{5(10)}$-androstene-3β,17β-diol-17-benzoate in 30 cc. of methylene chloride, the solution was cooled to 0° C. and a solution of 12 g. of anhydrous hydrogen fluoride in 20 cc. of tetrahydrofuran cooled in a Dry Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate evaporated to dryness whereby there was obtained a residue which upon chromatography afforded 3β-fluoro-19-nor-$\Delta^{5(10)}$-androsten-17β-ol-benzoate and 3α-fluoro-19-nor-$\Delta^{5(10)}$-androsten-17β-ol-benzoate.

By the same procedure 2α-methyl-19-nor-$\Delta^{5(10)}$-androstene-3β,17β-diol-17-benzoate was converted into 3β-fluoro-2α-methyl-19-nor-$\Delta^{5(10)}$-androsten-17β-ol-benzoate and the 3α-fluoro isomer thereof.

Example VII

To a solution of 5 g. of 19-nor-$\Delta^{5(10)}$-androstene-3β,17β-diol-17-benzoate in 100 cc. of benzene were added 5 g. of phosphorous pentachloride and the resulting mixture was stirred at room temperature for 1 hour in the absence of moisture. It was then cooled, poured into water; the benzene layer was washed with water several times, dried over anhydrous sodium sulfate and evaporated to dryness. Chromatography of the residue yielded 3β-chloro-19-nor-$\Delta^{5(10)}$-androsten-17β-ol-benzoate and 3α-chloro-19-nor-$\Delta^{5(10)}$-androsten-17β-ol-benzoate.

Following the above technique was treated 2α-methyl-19-nor-$\Delta^{5(10)}$-androstene-3β,17β-diol-17-benzoate thus yielding 3β-chloro-2α-methyl-19-nor-$\Delta^{5(10)}$-androsten-17β-ol-benzoate and the 3α-chloro isomer thereof.

Example VIII 19-nor-$\Delta^{5(10)}$-androstene-3β,17β-diol-17-benzoate and 2α-methyl-19-nor-$\Delta^{5(10)}$-androstene-3β,17β-diol-17-benzoate were treated by the procedure described in the foregoing example, except that phosphorus pentachloride was substituted by phosphorus pentabromide, thus giving respectively 3β-bromo-19-nor-$\Delta^{5(10)}$-androsten-17β-ol-benzoate, 3α-bromo-19-nor-$\Delta^{5(10)}$-androsten-17β-ol-benzoate, 3β-bromo-2α-methyl-19-nor-$\Delta^{5(10)}$-androsten-17β-ol-benzoate and 3α-bromo-2α-methyl-19-nor-$\Delta^{5(10)}$-androsten-17β-ol-benzoate.

Example IX

A solution of 1 g. of 3β-fluoro-19-nor-$\Delta^{5(10)}$-androsten-17β-ol-benzoate in 50 cc. of tetrahydrofuran was added over a 30 minute period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 3β-fluoro-19-nor-$\Delta^{5(10)}$-androsten-17β-ol.

When applying the above procedure to the starting compounds under I there were obtained the corresponding products under II.

| I | II |
|---|---|
| 3β-chloro - 19 - nor-$\Delta^{5(10)}$-androsten - 17β - ol-benzoate | 3β-chloro - 19 - nor-$\Delta^{5(10)}$-androsten-17β-ol |
| 3α-chloro - 19 - nor-$\Delta^{5(10)}$-androsten - 17β - ol-benzoate | 3α-chloro - 19 - nor-$\Delta^{5(10)}$-androsten-17β-ol |
| 3β-bromo - 19 - nor-$\Delta^{5(10)}$-androsten - 17β-ol-benzoate | 3β-bromo - 19 - nor-$\Delta^{5(10)}$-androsten-17β-ol |
| 3α-bromo - 19 - nor-$\Delta^{5(10)}$-androsten - 17β - ol-benzoate | 3α-bromo - 19 - nor-$\Delta^{5(10)}$-androsten-17β-ol |
| 3β-fluoro - 2α - methyl-19-nor-$\Delta^{5(10)}$-androsten - 17β-ol-benzoate | 3β-fluoro - 2α - methyl-19-nor - $\Delta^{5(10)}$ - androsten-17β-ol |
| 3α-fluoro - 2α - methyl-19-nor-$\Delta^{5(10)}$-androsten - 17β-ol-benzoate | 3α-fluoro - 2α - methyl-19-nor - $\Delta^{5(10)}$ - androsten-17β-ol |
| 3β-chloro - 2α - methyl-19-nor-$\Delta^{5(10)}$-androsten - 17β-ol-benzoate | 3β-chloro - 2α -methyl-19-nor - $\Delta^{5(10)}$ - androsten-17β-ol |
| 3α-chloro - 2α - methyl-19-nor-$\Delta^{5(10)}$-androsten - 17β-ol-enzoate | 3α-chloro - 2α - methyl-19-nor - $\Delta^{5(10)}$ - androsten-17β-ol |
| 3β-bromo - 2α - methyl-19-nor-$\Delta^{5(10)}$-androsten - 17β-ol-benzoate | 3β - bromo - 2α - methyl-19 - nor - $\Delta^{5(10)}$ - androsten-17β-ol |
| 3α-bromo - 2α - methyl-19-nor-$\Delta^{5(10)}$-androsten - 17β-ol-benzoate | 3α-bromo - 2α - methyl-19-nor - $\Delta^{5(10)}$ - androsten-17β-ol |
| 3α-fluoro - 19 - nor-$\Delta^{5(10)}$-androsten - 17β - ol-benzoate | 3α-fluoro - 19 - nor-$\Delta^{5(10)}$-androsten-17β-ol |

*Example X*

A solution of 1 g. of 3β-fluoro-19-nor-$\Delta^{5(10)}$-androsten-17β-ol in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 3β-fluoro-19-nor-$\Delta^{5(10)}$-androsten-17-one.

The starting compounds under I were treated by the foregoing method yielding the products under II.

| I | II |
|---|---|
| 3β-chloro - 19 - nor-$\Delta^{5(10)}$-androsten-17β-ol | 3β-chloro - 19 - nor-$\Delta^{5(10)}$-androsten-17-one |
| 3α-chloro - 19 - nor-$\Delta^{5(10)}$-androsten-17β-ol | 3α-chloro - 19 - nor-$\Delta^{5(10)}$-androsten-17-one |
| 3β-bromo - 19 - nor-$\Delta^{5(10)}$-androsten-17β-ol | 3β-bromo - 19 - nor-$\Delta^{5(10)}$-androsten-17-one |
| 3α-bromo - 19 - nor-$\Delta^{5(10)}$-androsten-17β-ol | 3α-bromo - 19 - nor-$\Delta^{5(10)}$-androsten-17-one |
| 3β-fluoro - 2α - methyl-19-nor-$\Delta^{5(10)}$-androsten - 17β-ol | 3β-fluoro - 2α - methyl-19-nor - $\Delta^{5(10)}$ - androsten-17-one |
| 3α-fluoro - 2α - methyl-19-nor-$\Delta^{5(10)}$-androsten - 17β-ol | 3α-fluoro - 2α - methyl-19-nor - $\Delta^{5(10)}$ - androsten-17-one |
| 3β-chloro - 2α - methyl -19-nor-$\Delta^{5(10)}$-androsten - 17β-ol | 3β-chloro - 2α - methyl-19-nor - $\Delta^{5(10)}$ - androsten-17-one |
| 3α-chloro - 2α - methyl-19-nor-$\Delta^{5(10)}$-androsten - 17β-ol | 3α-chloro - 2α - methyl-19-nor - $\Delta^{5(10)}$ - androsten-17-one |
| 3β-bromo - 2α - methyl-19-nor-$\Delta^{5(10)}$-androsten - 17β-ol | 3β-bromo - 2α - methyl-19-nor - $\Delta^{5(10)}$ - androsten-17-one |
| 3α-bromo - 2α - methyl-19-nor-$\Delta^{5(10)}$-androsten - 17β-ol | 3α-bromo - 2α - methyl-19-nor - $\Delta^{5(10)}$ - androsten-17-one |
| 3α-fluoro - 19 - nor-$\Delta^{5(10)}$-androsten-17β-ol | 3α-fluoro - 19 - nor-$\Delta^{5(10)}$-androsten-17-one |

*Example XI*

A solution of 5 g. of 3β-fluoro-19-nor-$\Delta^{5(10)}$-androsten-17-one in 250 cc. of thiophene-free benzene was treated with 27.5 cc. of 4 N methyl magnesium bromide in ether and the mixture refluxed with the exclusion of moisture for 3 hours. Th cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 3β-fluoro-17α-methyl - 19 - nor-$\Delta^{5(10)}$-androsten-17β-ol.

Following the above procedure, the starting compounds listed below were converted into the products disclosed hereinafter.

| Starting Compound | Product |
|---|---|
| 3β-chloro - 19 - nor-$\Delta^{5(10)}$-androsten-17-one | 3β-chloro - 17α - methyl-19-nor - $\Delta^{5(10)}$ - androsten-17β-ol |
| 3α-chloro - 19 - nor-$\Delta^{5(10)}$-androsten-17-one | 3α-chloro - 17α - methyl-19-nor - $\Delta^{5(10)}$ - androsten-17β-ol |
| 3β-bromo - 19 - nor-$\Delta^{5(10)}$-androsten-17-one | 3β-bromo - 17α - methyl-19-nor - $\Delta^{5(10)}$ - androsten-17β-ol |
| 3α-bromo - 19 - nor-$\Delta^{5(10)}$-androsten-17-one | 3α-bromo - 17α - methyl-19-nor - $\Delta^{5(10)}$ - androsten-17β-ol |
| 3β-fluoro - 2α - methyl-19-nor - $\Delta^{5(10)}$ - androsten-17-one | 3β-fluoro - 2α,17α - dimethyl - 19 - nor-$\Delta^{5(10)}$-androsten-17β-ol |
| 3α-fluoro - 2α - methyl-19-nor - $\Delta^{5(10)}$ - androsten-17-one | 3α-fluoro - 2α,17α - dimethyl - 19 - nor-$\Delta^{5(10)}$-androsten-17β-ol |
| 3β-chloro - 2α - methyl-19-nor - $\Delta^{5(10)}$ - androsten-17-one | 3β - chloro - 2α,17α - dimethyl - 19 - nor-$\Delta^{5(10)}$-androsten-17β-ol |
| 3α-chloro - 2α - methyl-19-nor - $\Delta^{5(10)}$ - androsten-17-one | 3α - chloro - 2α,17α - dimethyl - 19 - nor-$\Delta^{5(10)}$-androsten-17β-ol |
| 3β-bromo - 2α - methyl-19-nor - $\Delta^{5(10)}$ - androsten-17-one | 3β - bromo - 2α,17α - dimethyl - 19 - nor-$\Delta^{5(10)}$-androsten-17β-ol |
| 3α-bromo - 2α - methyl-19-nor - $\Delta^{5(10)}$ - androsten-17-one | 3α - bromo - 2α,17α - dimethyl - 19 - nor-$\Delta^{5(10)}$-androsten-17β-ol |
| 3α-fluoro - 19 - nor-$\Delta^{5(10)}$-androsten-17-one | 3α - fluoro - 17α - methyl-19 - nor - $\Delta^{5(10)}$ - androsten-17β-ol |

*Example XII*

3β-fluoro-19-nor-$\Delta^{5(10)}$-androsten-17-one was treated by the procedure described in the foregoing example, except that methyl magnesium bromide was substituted by vinyl magnesium bromide thus yielding 3β-fluoro-17α-vinyl-19-nor-$\Delta^{5(10)}$-androsten-17β-ol.

By the same procedure, the starting compounds under I were transformed into the products under II.

| I | II |
|---|---|
| 3β-chloro - 19 - nor-$\Delta^{5(10)}$-androsten-17-one | 3β-chloro - 17α - vinyl-19-nor - $\Delta^{5(10)}$ - androsten-17β-ol |
| 3α-chloro - 19 - nor-$\Delta^{5(10)}$-androsten-17-one | 3α-chloro - 17α - vinyl-19-nor - $\Delta^{5(10)}$ - androsten-17β-ol |

| I | II |
|---|---|
| 3β-bromo - 19 - nor-Δ$^{5(10)}$-androsten-17-one | 3β-bromo - 17α - vinyl-19-nor - Δ$^{5(10)}$ - androsten-17β-ol |
| 3α-bromo - 19 - nor - Δ$^{5(10)}$-androsten-17-one | 3α-bromo - 17α - vinyl-19-nor - Δ$^{5(10)}$ - androsten-17β-ol |
| 3β-fluoro - 2α - methyl-19-nor - Δ$^{5(10)}$ - androsten-17-one | 3β - fluoro-2α-methyl-17α-vinyl - 19 - nor-Δ$^{5(10)}$-androsten-17β-ol |
| 3α-fluoro - 2α - methyl-19-nor - Δ$^{5(10)}$ - androsten-17-one | 3α - fluoro-2α-methyl-17α-vinyl - 19 - nor-Δ$^{5(10)}$-androsten-17β-ol |
| 3β-chloro - 2α - methyl-19-nor - Δ$^{5(10)}$ - androsten-17-one | 3β - chloro-2α-methyl-17α-vinyl - 19 - nor-Δ$^{5(10)}$-androsten-17β-ol |
| 3α-chloro - 2α - methyl-19-nor - Δ$^{5(10)}$ - androsten-17-one | 3α - chloro-2α-methyl-17α-vinyl - 19 - nor-Δ$^{5(10)}$-androsten-17β-ol |
| 3β-bromo - 2α - methyl-19-nor - Δ$^{5(10)}$ - androsten-17-one | 3β-bromo - 2α - methyl-17α - vinyl - 19 - nor-Δ$^{5(10)}$-androsten - 17β-ol |
| 3α-bromo - 2α - methyl-19-nor - Δ$^{5(10)}$ - androsten-17-ol | 3α-bromo - 2α - methyl-17α - vinyl - 19 - nor-Δ$^{5(10)}$-androsten - 17β-ol |
| 3α-fluoro - 19 - nor-Δ$^{5(10)}$-androsten-17-one | 3α-fluoro - 17α - vinyl-19-nor - Δ$^{5(10)}$ - androsten-17β-ol |

Example XIII

3β-fluoro-19-nor-Δ$^{5(10)}$-androsten-17-one was submitted to the treatment described in Example XI, except that methyl magnesium bromide was substituted by ethynyl magnesium bromide, thus giving 3β-fluoro-17α-ethynyl-19-nor-Δ$^{5(10)}$-androsten-17β-ol.

When applying the same procedure to the starting compounds listed below, there were produced the corresponding products hereinafter set forth.

| Starting Compound | Product |
|---|---|
| 3β-chloro - 19 - nor-Δ$^{5(10)}$-androsten-17-one | 3β - chloro - 17α - ethynyl-19-nor - Δ$^{5(10)}$ - androsten-17β-ol |
| 3α-chloro - 19 - nor-Δ$^{5(10)}$-androsten-17-one | 3α-chloro - 17α - ethynyl-19-nor - Δ$^{5(10)}$ - androsten-17β-ol |
| 3β-bromo - 19 - nor-Δ$^{5(10)}$-androsten-17-one | 3β-bromo - 17α - ethynyl-19-nor - Δ$^{5(10)}$ - androsten-17β-ol |
| 3α-bromo - 19 - nor-Δ$^{5(10)}$-androsten-17-one | 3α - bromo - 17α - ethynyl-19-nor - Δ$^{5(10)}$ - androsten-17β-ol |
| 3β-fluoro - 2α - methyl-19-nor - Δ$^{5(10)}$ - androsten-17-one | 3β-fluoro - 2α - methyl-17α-ethynyl - 19 - nor-Δ$^{5(10)}$-androsten - 17β-ol |
| 3α-fluoro - 2α - methyl-19-nor - Δ$^{5(10)}$ - androsten-17-one | 3α-fluoro - 2α - methyl-17α-ethynyl - 19 - nor-Δ$^{5(10)}$-androsten - 17β-ol |
| 3β-chloro - 2α - methyl-19-nor - Δ$^{5(10)}$ - androsten-17-one | 3β-chloro - 2α - methyl-17α-ethynyl - 19 - nor-Δ$^{5(10)}$ - androsten - 17β-ol |
| 3α-chloro - 2α - methyl-19-nor - Δ$^{5(10)}$ - androsten-17-one | 3α-chloro - 2α - methyl-17α-ethynyl - 19 - nor-Δ$^{5(10)}$ - androsten - 17β-ol |
| 3β-bromo - 2α - methyl-19-nor - Δ$^{5(10)}$ - androsten-17-one | 3β-bromo - 2α - methyl-17α - ethynyl - 19 - nor-Δ$^{5(10)}$ - androsten - 17β-ol |
| 3α-bromo - 2α - methyl-19-nor - Δ$^{5(10)}$ - androsten-17-one | 3α-bromo - 2α - methyl-17α-ethynyl - 19 - nor-Δ$^{5(10)}$ - androsten-17β-ol |
| 3α-fluoro - 19 - nor-Δ$^{5(10)}$-androsten-17-one | 3α-fluoro - 17α - ethynyl-19-nor - Δ$^{5(10)}$ - androsten-17β-ol |

Example XIV

3β-fluoro-19-nor-Δ$^{5(10)}$-androsten-17β-ol was treated following the procedure described in Example III, but using acetic anhydride instead of benzoyl chloride, thus giving the acetate of 3β-fluoro-19-nor-Δ$^{5(10)}$-androsten-17β-ol.

In accordance with the same procedure, the starting compounds under I were converted into the products under II.

| I | II |
|---|---|
| 3β-chloro - 19 - nor-Δ$^{5(10)}$-androsten-17β-ol | acetate of 3β - chloro-19-nor - Δ$^{5(10)}$ - androsten-17β-ol |
| 3α-chloro - 19 - nor-Δ$^{5(10)}$-androsten-17β-ol | acetate of 3α - chloro-19-nor - Δ$^{5(10)}$ - androsten-17β-ol |
| 3β-bromo - 19 - nor - Δ$^{5(10)}$-androsten-17β-ol | acetate of 3β - bromo-19-nor - Δ$^{5(10)}$ - androsten-17β-ol |
| 3α-bromo - 19 - nor-Δ$^{5(10)}$-androsten-17β-ol | acetate of 3α - bromo-19-nor - Δ$^{5(10)}$ - androsten-17β-ol |
| 3β-fluoro - 2α - methyl-19-nor - Δ$^{5(10)}$ - androsten-17β-ol | acetate of 3β - fluoro-2α-methyl - 19 - nor-Δ$^{5(10)}$-androsten-17β-ol |
| 3α-fluoro - 2α - methyl-19-nor - Δ$^{5(10)}$ - androsten-17β-ol | acetate of 3α - fluoro-2α-methyl - 19 - nor-Δ$^{5(10)}$-androsten-17β-ol |
| 3β-chloro - 2α - methyl-19-nor - Δ$^{5(10)}$ - androsten-17β-ol | acetate of 3β - chloro-2α-methyl - 19 - nor-Δ$^{5(10)}$-androsten-17β-ol |
| 3α-chloro - 2α - methyl-19-nor - Δ$^{5(10)}$ - androsten-17β-ol | acetate of 3α - chloro-2α-methyl - 19 - nor-Δ$^{5(10)}$-androsten-17β-ol |
| 3β-bromo - 2α - methyl-19-nor - Δ$^{5(10)}$ - androsten-17β-ol | acetate of 3β - bromo-2α-methyl - 19 - nor-Δ$^{5(10)}$-androsten-17β-ol |
| 3α-bromo - 2α - methyl-19-nor - Δ$^{5(10)}$ - androsten-17β-ol | acetate of 3α - bromo-2α-methyl - 19 - nor-Δ$^{5(10)}$-androsten-17β-ol |
| 3α-fluoro - 19 - nor-Δ$^{5(10)}$-androsten-17β-ol | acetate of 3α-fluoro - 19 - nor - Δ$^{5(10)}$ - androsten-17β-ol |

Example XV

To a solution of 5 g. of 3β-fluoro-17α-methyl-19-nor-Δ$^{5(10)}$-androsten-17β-ol in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the acetate of 3β-fluoro-17α - methyl-19-nor-Δ$^{5(10)}$-androsten-17β-ol.

The starting compounds listed below were treated by the preceding method, thus furnishing the corresponding products hereinafter set forth.

| Starting Compound | Product |
|---|---|
| 3β-chloro-17α-methyl-19-nor-Δ$^{5(10)}$-androsten-17β-ol | acetate of 3β-chloro-17α-methyl-19-nor-Δ$^{5(10)}$-androsten-17β-ol |
| 3α-chloro-17α-methyl-19-nor-Δ$^{5(10)}$-androsten-17β-ol | acetate of 3α-chloro-17α-methyl-19-nor-Δ$^{5(10)}$-androsten-17β-ol |

| Starting Compound | Product | Starting Compound | Product |
|---|---|---|---|
| 3β-bromo-17α-methyl-19-nor-Δ5(10)-androsten-17β-ol | acetate of 3β-bromo-17α-methyl-19-nor-Δ5(10)-androsten-17β-ol | 3β-chloro-17α-ethynyl-19-nor-Δ5(10)-androsten-17β-ol | acetate of 3β-chloro-17α-ethynyl-19-nor-Δ5(10)-androsten-17β-ol |
| 3α-bromo-17α-methyl-19-nor-Δ5(10)-androsten-17β-ol | acetate of 3α-bromo-17α-methyl-19-nor-Δ5(10)-androsten-17β-ol | 3α-chloro-17α-ethynyl-19-nor-Δ5(10)-androsten-17β-ol | acetate of 3α-chloro-17α-ethynyl-19-nor-Δ5(10)-androsten-17β-ol |
| 3β-fluoro-2α,17α-dimethyl-19-nor-Δ5(10)-androsten-17β-ol | acetate of 3β-fluoro-2α,17α-dimethyl-19-nor-Δ5(10)-androsten-17β-ol | 3β-bromo-17α-ethynyl-19-nor-Δ5(10)-androsten-17β-ol | acetate of 3β-bromo-17α-ethynyl-19-nor-Δ5(10)-androsten-17β-ol |
| 3α-fluoro-2α,17α-dimethyl-19-nor-Δ5(10)-androsten-17β-ol | acetate of 3α-fluoro-2α,17α-dimethyl-19-nor-Δ5(10)-androsten-17β-ol | 3α-bromo-17α-ethynyl-19-nor-Δ5(10)-androsten-17β-ol | acetate of 3α-bromo-17α-ethynyl-19-nor-Δ5(10)-androsten-17β-ol |
| 3β-chloro-2α,17α-dimethyl-19-nor-Δ5(10)-androsten-17β-ol | acetate of 3β-chloro-2α,17α-dimethyl-19-nor-Δ5(10)-androsten-17β-ol | 3β-fluoro-2α-methyl-17α-ethynyl-19-nor-Δ5(10)-androsten-17β-ol | acetate of 3β-fluoro-2α-methyl-17α-ethynyl-19-nor-Δ5(10)-androsten-17β-ol |
| 3α-chloro-2α,17α-dimethyl-19-nor-Δ5(10)-androsten-17β-ol | acetate of 3α-chloro-2α,17α-dimethyl-19-nor-Δ5(10)-androsten-17β-ol | 3α-fluoro-2α-methyl-17α-ethynyl-19-nor-Δ5(10)-androsten-17β-ol | acetate of 3α-fluoro-2α-methyl-17α-ethynyl-19-nor-Δ5(10)-androsten-17β-ol |
| 3β-bromo-2α,17α-dimethyl-19-nor-Δ5(10)-androsten-17β-ol | acetate of 3β-bromo-2α,17α-dimethyl-19-nor-Δ5(10)-androsten-17β-ol | 3β-chloro-2α-methyl-17α-ethynyl-19-nor-Δ5(10)-androsten-17β-ol | acetate of 3β-chloro-2α-methyl-17α-ethynyl-19-nor-Δ5(10)-androsten-17β-ol |
| 3α-bromo-2α,17α-dimethyl-19-nor-Δ5(10)-androsten-17β-ol | acetate of 3α-bromo-2α,17α-dimethyl-19-nor-Δ5(10)-androsten-17β-ol | 3α-chloro-2α-methyl-17α-ethynyl-19-nor-Δ5(10)-androsten-17β-ol | acetate of 3α-chloro-2α-methyl-17α-ethynyl-19-nor-Δ5(10)-androsten-17β-ol |
| 3α-fluoro-17α-methyl-19-nor-Δ5(10)-androsten-17β-ol | acetate of 3α-fluoro-17α-methyl-19-nor-Δ5(10)-androsten-17β-ol | 3β-bromo-2α-methyl-17α-ethynyl-19-nor-Δ5(10)-androsten-17β-ol | acetate of 3β-bromo-2α-methyl-17α-ethynyl-19-nor-Δ5(10)-androsten-17β-ol |
| 3β-fluoro-17α-vinyl-19-nor-Δ5(10)-androsten-17β-ol | acetate of 3β-fluoro-17α-vinyl-19-nor-Δ5(10)-androsten-17β-ol | 3α-bromo-2α-methyl-17α-ethynyl-19-nor-Δ5(10)-androsten-17β-ol | acetate of 3α-bromo-2α-methyl-17α-ethynyl-19-nor-Δ5(10)-androsten-17β-ol |
| 3β-chloro-17α-vinyl-19-nor-Δ5(10)-androsten-17β-ol | acetate of 3β-chloro-17α-vinyl-19-nor-Δ5(10)-androsten-17β-ol | 3α-fluoro-17α-ethynyl-19-nor-Δ5(10)-androsten-17β-ol | acetate of 3α-fluoro-17α-ethynyl-19-nor-Δ5(10)-androsten-17β-ol |
| 3α-chloro-17α-vinyl-19-nor-Δ5(10)-androsten-17β-ol | acetate of 3α-chloro-17α-vinyl-19-nor-Δ5(10)-androsten-17β-ol | | |
| 3β-bromo-17α-vinyl-19-nor-Δ5(10)-androsten-17β-ol | acetate of 3β-bromo-17α-vinyl-19-nor-Δ5(10)-androsten-17β-ol | | |
| 3α-bromo-17α-vinyl-19-nor-Δ5(10)-androsten-17β-ol | acetate of 3α-bromo-17α-vinyl-19-nor-Δ5(10)-androsten-17β-ol | | |
| 3β-fluoro-2α-methyl-17α-vinyl-19-nor-Δ5(10)-androsten-17β-ol | acetate of 3β-fluoro-2α-methyl-17α-vinyl-19-nor-Δ5(10)-androsten-17β-ol | | |
| 3α-fluoro-2α-methyl-17α-vinyl-19-nor-Δ5(10)-androsten-17β-ol | acetate of 3α-fluoro-2α-methyl-17α-vinyl-19-nor-Δ5(10)-androsten-17β-ol | | |
| 3β-chloro-2α-methyl-17α-vinyl-19-nor-Δ5(10)-androsten-17β-ol | acetate of 3β-chloro-2α-methyl-17α-vinyl-19-nor-Δ5(10)-androsten-17β-ol | | |
| 3α-chloro-2α-methyl-17α-vinyl-19-nor-Δ5(10)-androsten-17β-ol | acetate of 3α-chloro-2α-methyl-17α-vinyl-19-nor-Δ5(10)-androsten-17β-ol | | |
| 3β-chloro-2α-methyl-17α-vinyl-19-nor-Δ5(10)-androsten-17β-ol | acetate of 3β-bromo-2α-methyl-17α-vinyl-19-nor-Δ5(10)-androsten-17β-ol | | |
| 3α-bromo-2α-methyl-17α-vinyl-19-nor-Δ5(10)-androsten-17β-ol | acetate of 3α-bromo-2α-methyl-17α-vinyl-19-nor-Δ5(10)-androsten-17β-ol | | |
| 3α-fluoro-17α-vinyl-19-nor-Δ5(10)-androsten-17β-ol | acetate of 3α-fluoro-17α-vinyl-19-nor-Δ5(10)-androsten-17β-ol | | |
| 3β-fluoro-17α-ethynyl-19-nor-Δ5(10)-androsten-17β-ol | acetate of 3β-fluoro-17α-ethynyl-19-nor-Δ5(10)-androsten-17β-ol | | |

Example XVI

The starting compounds set forth in the foregoing example were treated by the procedure described in this example, except that acetic anhydride was substituted by propionic anhydride, caproic anhydride and cyclopentylpropionic anhydride, thus giving the propionates, caproates and cyclopentylpropionates of said starting compounds.

We claim:

1. A compound of the following formula:

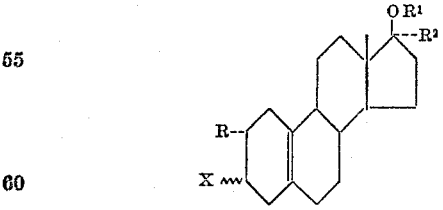

wherein X is selected from the group consisting of fluorine, chlorine and bromine; R is a member of the group consisting of hydrogen and methyl; R¹ is selected from the group consisting of hydrogen and a hydrocarbon carboxylic acyl group of less than 12 carbon atoms; and R² is a member of the group consisting of hydrogen, lower alkyl, lower alkenyl and lower alkynyl.

2. 3-fluoro-19-nor-Δ5(10)-androsten-17β-ol.
3. 3-chloro-19-nor-Δ5(10)-androsten-17β-ol.
4. 3-bromo-19-nor-Δ5(10)-androsten-17β-ol.
5. 3-fluoro-2α-methyl-19-nor-Δ5(10)-androsten-17β-ol.
6. 3-chloro-2α-methyl-19-nor-Δ5(10)-androsten-17β-ol.
7. 3-bromo-2α-methyl-19-nor-Δ5(10)-androsten-17β-ol.
8. 3-fluoro-17α-methyl-19-nor-Δ5(10)-androsten-17β-ol.

9. 3-chloro-17α-methyl-19-nor-Δ⁵⁽¹⁰⁾-androsten-17β-ol.
10. 3-bromo-17α-methyl-19-nor-Δ⁵⁽¹⁰⁾-androsten - 17β-ol.
11. 3-fluoro-2α,17α - dimethyl-19-nor-Δ⁵⁽¹⁰⁾-androsten-17β-ol.
12. 3-chloro-2α,17α - dimethyl-19-nor-Δ⁵⁽¹⁰⁾-androsten-17β-ol.
13. 3-bromo-2α,17α-dimethyl - 19-nor-Δ⁵⁽¹⁰⁾-androsten-17β-ol.
14. 3-fluoro-17α-vinyl-19-nor-Δ⁵⁽¹⁰⁾-androsten-17β-ol.
15. 3-chloro-17α-vinyl-19-nor-Δ⁵⁽¹⁰⁾-androsten-17β-ol.
16. 3-fluoro-2α-methyl-17α - vinyl-19-nor-Δ⁵⁽¹⁰⁾-androsten-17β-ol.
17. 3-chloro-2α-methyl-17α - vinyl-19-nor-Δ⁵⁽¹⁰⁾-androsten-17β-ol.
18. 3-fluoro-17α-ethynyl-19-nor-Δ⁵⁽¹⁰⁾-androsten - 17β-ol.
19. 3-chloro-17α-ethynyl-19-nor-Δ⁵⁽¹⁰⁾-androsten - 17β-ol.
20. 3-fluoro-2α-methyl-17α - ethynyl - 19 - nor-Δ⁵⁽¹⁰⁾-androsten-17β-ol.

No references cited.